United States Patent [19]
Woller

[11] Patent Number: 5,979,603
[45] Date of Patent: Nov. 9, 1999

[54] PORTABLE TREE STAND HAVING FIBER COMPOSITE PLATFORM

[75] Inventor: Ronald R. Woller, Decatur, Ala.

[73] Assignee: Summit Specialties, Inc., Decatur, Ala.

[21] Appl. No.: 08/369,434

[22] Filed: Jan. 6, 1995

[51] Int. Cl.⁶ .................................................. A45F 3/00
[52] U.S. Cl. ............................ 182/187; 182/46; 182/135
[58] Field of Search ...................... 182/187, 188, 182/135, 136, 46, 134

[56] References Cited

U.S. PATENT DOCUMENTS

| | | |
|---|---|---|
| 2,689,602 | 9/1954 | Morgan . |
| 2,885,132 | 5/1959 | Campbell ................................. 182/46 |
| 3,485,320 | 12/1969 | Jones . |
| 3,856,111 | 12/1974 | Baker . |
| 3,871,482 | 3/1975 | Southard . |
| 3,955,645 | 5/1976 | Dye . |
| 3,960,240 | 6/1976 | Cotton . |
| 4,130,180 | 12/1978 | Ferguson et al. . |
| 4,137,995 | 2/1979 | Fonte . |
| 4,168,765 | 9/1979 | Ferguson et al. . |
| 4,230,203 | 10/1980 | Sweat et al. . |
| 4,244,445 | 1/1981 | Strode . |
| 4,258,951 | 3/1981 | Groom . |
| 4,316,526 | 2/1982 | Amacker . |
| 4,321,983 | 3/1982 | Nelson . |
| 4,331,216 | 5/1982 | Amacker . |
| 4,417,645 | 11/1983 | Untz . |
| 4,427,092 | 1/1984 | Tentler . |
| 4,452,338 | 6/1984 | Untz . |
| 4,474,265 | 10/1984 | Shinkle . |
| 4,475,627 | 10/1984 | Eastridge . |
| 4,597,473 | 7/1986 | Peck . |
| 4,787,476 | 11/1988 | Lee . |
| 4,802,552 | 2/1989 | Williams . |
| 4,813,441 | 3/1989 | Kepley . |
| 4,890,694 | 1/1990 | Williams . |
| 4,942,942 | 7/1990 | Bradley . |
| 4,953,662 | 9/1990 | Porter . |
| 4,987,972 | 1/1991 | Helms . |
| 5,016,733 | 5/1991 | Bradley . |
| 5,049,110 | 9/1991 | Owens . |
| 5,086,874 | 2/1992 | Treants . |
| 5,103,935 | 4/1992 | Amacker . |
| 5,167,298 | 12/1992 | Porter . |
| 5,217,221 | 6/1993 | Baum ..................................... 273/67 |
| 5,226,505 | 7/1993 | Woller ................................... 182/187 |
| 5,234,076 | 8/1993 | Louk et al. . |

Primary Examiner—Alvin Chin-Shue
Attorney, Agent, or Firm—Gardner & Groff, P.C.

[57] ABSTRACT

A climbing device for a tree or other vertical columnar member having a platform fashioned from fiber-reinforced composite material. The platform is a one-piece structure having a peripheral skin with bi-directionally oriented reinforcing fibers and longitudinally extending reinforcing fibers. The back bar is also fashioned from fiber-reinforced composite material having a peripheral skin with bi-directionally oriented reinforcing fibers and longitudinally extending reinforcing fibers. Fiber-reinforced members include a foam core for shape retention. The manufacturing process permits use of T-shaped joints in fiber-reinforced structures.

9 Claims, 8 Drawing Sheets

PORTABLE TREE STAND HAVING FIBER COMPOSITE PLATFORM

BACKGROUND OF THE INVENTION

In its broadest aspects, this invention deals with joints in fiber reinforced composite materials. In an intermediate aspect, the present invention relates generally to auxiliary equipment used by active outdoorsmen. More specifically, this invention pertains to portable tree stands used by hunters, photographers, and naturalists, as well as methods of making fiber composite elements therefor.

Hunters, photographers and naturalists have realized the importance of obtaining a high viewing position to avoid detection and increase their visibility of animals. There have been numerous previous patents involving a variety of construction techniques and art forms for tree climbing devices, portable tree stands, platforms, seats, and hand-held climbing devices. This invention represents a significant improvement in weight reduction of tree climbing devices.

Climbing platforms are, of course, known in the prior art. See for example, U.S. Pat. No. 3,856,111 to Baker issued Dec. 24, 1974, and U.S. Pat. No. 4,168,765 to Ferguson issued Sep. 25, 1979.

The prior art has also taught use of two separate platforms, a lower one for the users feet, referred to as a foot climber, and another upper device, or stand, used to sit on. See, for example, U.S. Pat. No. 3,485,320 to Jones issued Dec. 23, 1969; U.S. Pat. No. 3,960,240 to Cotton issued Jun. 1, 1976; U.S. Pat. No. 4,137,995 to Fonte, issued Feb. 6, 1979; U.S. Pat. No. 4,230,203 to Sweat et al., issued Oct. 28, 1980; U.S. Pat. No. 4,316,526 to Amacker, issued Feb. 23, 1982; U.S. Pat. No. 4,321,983 to Nelson, issued Mar. 30, 1982; U.S. Pat. No. 4,331,216 to Amacker, issued May 25, 1982; U.S. Pat. No. 4,417,645 to Untz, issued Nov. 29, 1983; U.S. Pat. No. 4,452,338 to Untz, issued Jun. 5, 1984; U.S. Pat. No. 4,942,942 to Bradley, issued Jul. 24, 1990; and U.S. Pat. No. 4,953,662 to Porter, issued Sep. 4, 1990. See also U.S. Pat. No. 4,427,092 to Tentler, issued Jan. 24, 1984; U.S. Pat. No. 4,597,473 to Peck, issued Jul. 1, 1986; U.S. Pat. No. 3,955,645 to Dye, issued May 11, 1976.

Generally speaking, the known tree climbing devices and elevated platforms have a substantially planar foot support platform made from a sheet of plywood, from a plurality of parallel wooden slats, from a plurality of metal slats, or the like. Typically, the platform portion of these devices represents a significant portion of the weight.

Weight reduction is a significant feature in these portable devices since the hunters, outdoorsmen, and photographers that use them ordinarily must carry the devices considerable distances, often over rough terrain. While some weight reductions have been accomplished in the past by using hollow structural members, and selecting lightweight metal members such as aluminum, these efforts have only been marginally successful. An overriding consideration is safety of the person using the device--which necessitates a rigid platform for supporting body weight and rigid structural members to both support the platform and engage the supporting tree, pole, or the like.

Thus, the need continues to exist for an improved, lightweight climbing device.

OBJECTS AND SUMMARY OF THE INVENTION

A general object of this invention is to provide a portable lightweight tree stand for either stationary or climbing use which overcomes problems of the type associated with the prior art devices.

Another object of this invention is to provide a tree stand apparatus that makes use of fiber-reinforced composite elements to both reduce weight and improve strength and stiffness.

A further object of this invention is to provide an efficient, inexpensive molding process for manufacturing a platform from fiber-reinforced composite materials that is both rigid and extremely lightweight.

These various objects are accomplished by a portable climbing device having a platform fabricated from fiber-reinforced composite material molded over a lightweight core, that may be a polymer foam. To further reduce weight, the platform includes a back bar assembly that is also fabricated from fiber-reinforced composite material molded over a lightweight core. The platform and back bar assemblies are connected to a frame structure that orients the platform in a generally horizontal posture relative to the support and permits the back bar to be adjusted so as to accommodate trees of various diameters.

To provide torsional stiffness, the fiber-reinforced components of the climbing device include a peripheral sheath or skin that includes bi-directionally oriented reinforcing fibers. Moreover, the fiber-reinforced components also include longitudinally oriented reinforcing fibers in selected planes.

To insure substantially noise-free operation of the climbing device, mechanical connections between subassemblies of the devices employ a gasket adhesive. In this manner, the stress exerted on mechanical connections during normal use does not generate squeaking noises where mechanically joined materials join one another.

DESCRIPTION OF THE DRAWINGS

Many other objects and advantages will be apparent to those skilled in the art when this specification is read in conjunction with the attached drawings wherein like reference numerals are applied to like elements and wherein.

DETAILED DESCRIPTION OF THE PREFERRED EMBODIMENT

Figure 1:
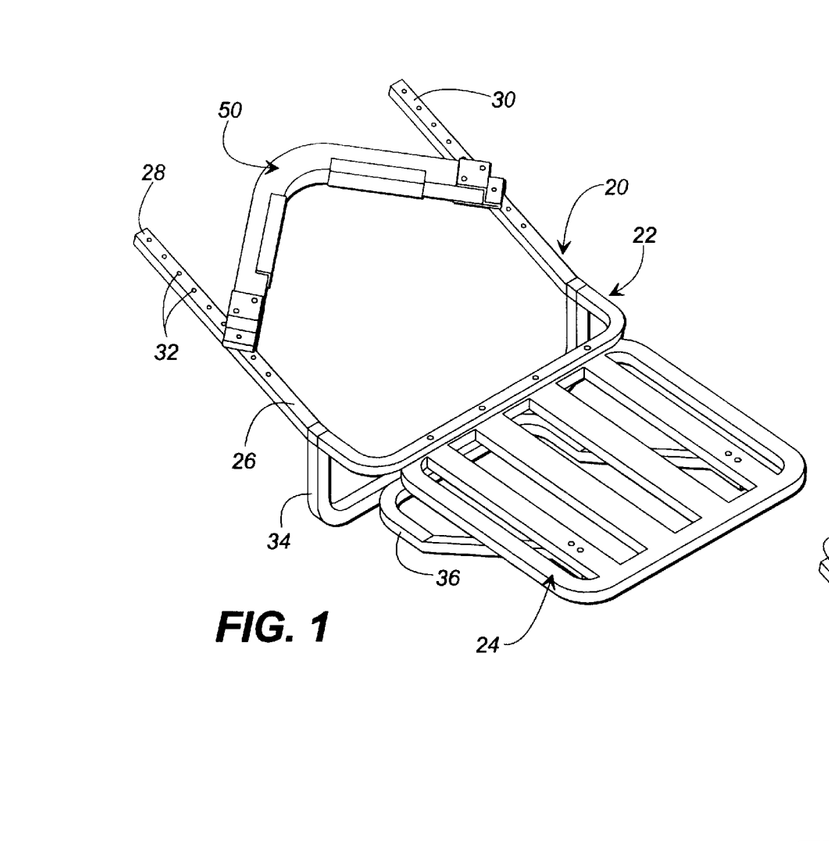
FIG. 1 is a perspective view of a portable device.

The general arrangement of a portable tree stand device 20 (see FIG. 1) according to the invention includes a frame structure 22 to which a fiber-reinforced platform assembly 24 is attached. The frame structure 22 may have a U-shaped element 26 with a pair of generally parallel side arms 28, 30 each of which is provided with a plurality of uniformly spaced adjustment holes 32 positioned adjacent the free end thereof. Preferably, the U-shaped element is fabricated from square cross-section aluminum tubing so that the U-shaped element 26 has a suitably low weight.

The frame structure 22 (FIG. 2) also includes a bearing element 34 and a platform brace 36. The bearing element 34 is mechanically attached at each end to corresponding side arms 28, 30 of the U-shaped element 26 and extends downwardly therefrom. Preferably, the bearing element 34 is fabricated from square cross-section steel tubing since it bears directly against the tree or other vertical support. By using hollow tubing the weight of the bearing element 34 is held to an acceptable low value. Each end of the bearing element 34 (see FIG. 3) has a corresponding steel, C-shaped, mounting clip 38, 40 welded thereto. These mounting clips 38, 40 open upwardly and are sized to accommodate the width of the arms 28, 30 of the U-shaped element 26. The mechanical connection between the mounting clips 38, 40 and the corresponding arms 28, 30 is effected by applying a suitable conventional silicone adhesive to the facing surfaces and then applying suitable conventional fasteners through ears of the clips 38, 40 into the sides of the arms 28, 30. If desired, sheet metal screws may be used as fasteners. The silicone adhesive not only functions as an adhesive, but also as functions a gasket between the dissimilar materials so as to reduce galvanic action therebetween while virtually eliminating the possibility of squeaking when the climbing device is in use.

The steel bearing element 34 preferably includes a pair of convex elements such as generally arcuate bends 42, 44 (see FIG. 3) laterally spaced from the midpoint thereof and protruding toward the space defined between the arms 28, 30. These bends 42, 44 may be integral with the bearing element 34 or welded thereto as depicted. Moreover, the bends 42, 44 define a pair of spaced bearing points that engage the lateral surface of a tree 45 or other vertical support thus giving stability from sideways movement of the structure.

Figure 2:
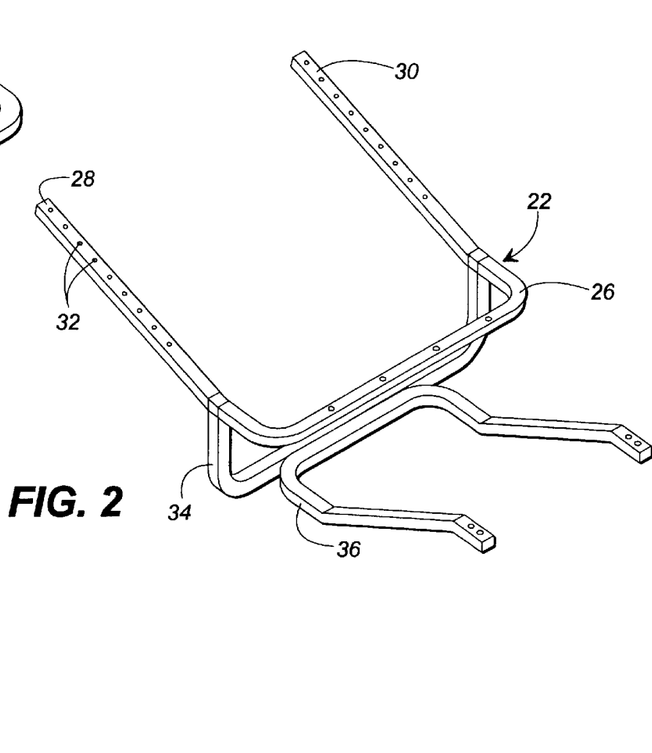
FIG. 2 is a perspective view of the frame used in the portable device.
Figure 3:
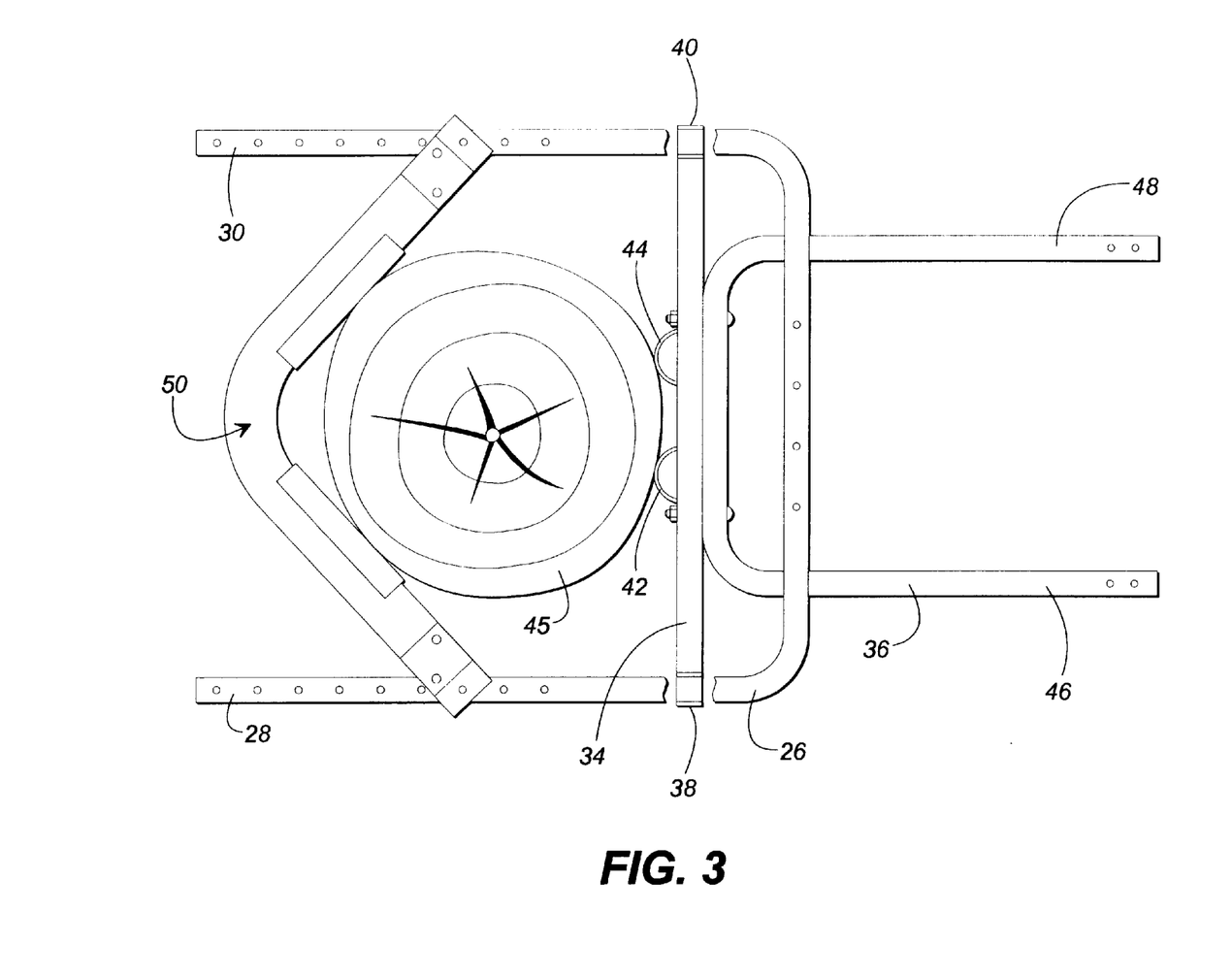
FIG. 3 is a plan view of the frame for the portable device of FIG. 2 with some portions broken away in the interest of clarity.

The platform brace 36 is preferably fabricated from square cross-section aluminum tubing and is mechanically attached to the bearing element 34 with suitable mechanical fasteners, such as bolts. Here again, a suitable conventional silicone adhesive is applied between the facing surfaces before the mechanical fasteners are applied. The platform brace 36 has a pair of parallel arms extending outwardly away from the arms 28, 30 of the U-shaped member and upwardly for attachment to the platform assembly itself.

In addition, a connecting member or back bar assembly 50 extends between the pair of side arms 28, 30. The back bar 50 has mechanical fasteners which engage corresponding holes 32 in the arms 28, 30 for connecting ends of the back bar 50 to the corresponding parallel arms 28, 30. To encircle a tree, each end of the back bar 50 is attached to a corresponding one of the two side arms 28, 30. By moving the back bar 50 attachment points to various holes 32 in the side arms 28, 30, the frame assembly 22 can be adjusted to accommodate trees of various diameters. The lateral spacing between the parallel arms 28, 30 defines the maximum girth with which the climbing device can be used.

The back bar 50 includes a curved beam 52 (see FIG. 4) having an angular bend 53 in the middle thereof. The angular bend 53 may, for example, define an angle of about 90° between the end portions of the back bar 50. The curved beam 52 is preferably fabricated from a carbon-fiber-reinforced composite material so as to be as light as practical while having increased strength characteristics. By way of example, it has been found that through use of the carbon-fiber-reinforced composite material of this back bar 50, the overall weight of the back bar 50 can be reduced by 60% while the strength of the back bar 50 against bending and torsion are increased by 3 to 5 times the strength of simple angle iron designs.

Figure 4:
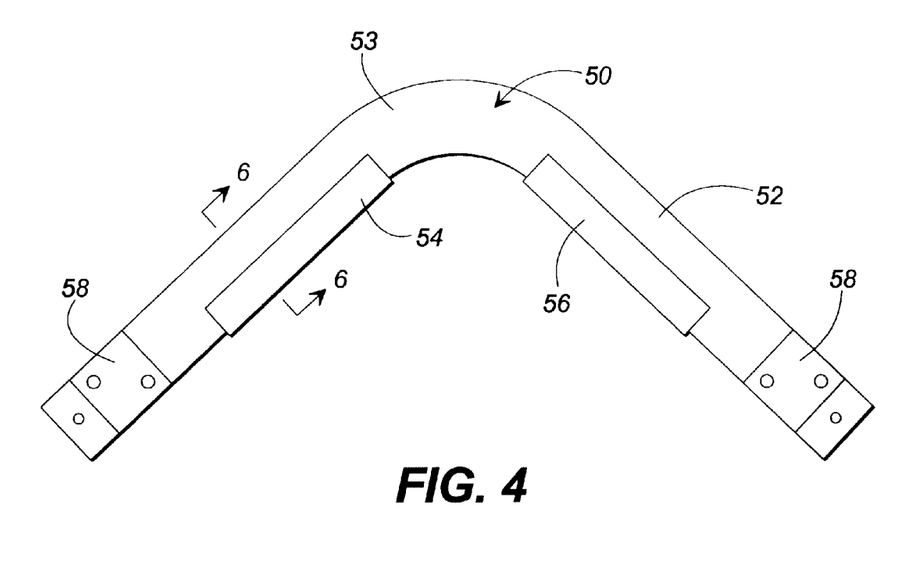
FIG. 4 is a plan view of the back bar used in conjunction with the portable device.

A steel bearing face 54, 56 is applied to each side of the curved beam 52 that will face the tree. These bearing faces 54, 56 may be fabricated from sheet steel formed into a C-shaped cross section proportioned to receive the thickness of the curved beam. Preferably, the bearing faces 54, 56 are attached to the curved beam 52 with silicone adhesive and mechanical fasteners, in the manner described above and for the same practical reasons. These bearing faces 54, 56 provide enhanced crush resistance for the curved beam 52 at the points where pressure from the tree is applied.

Figure 5:
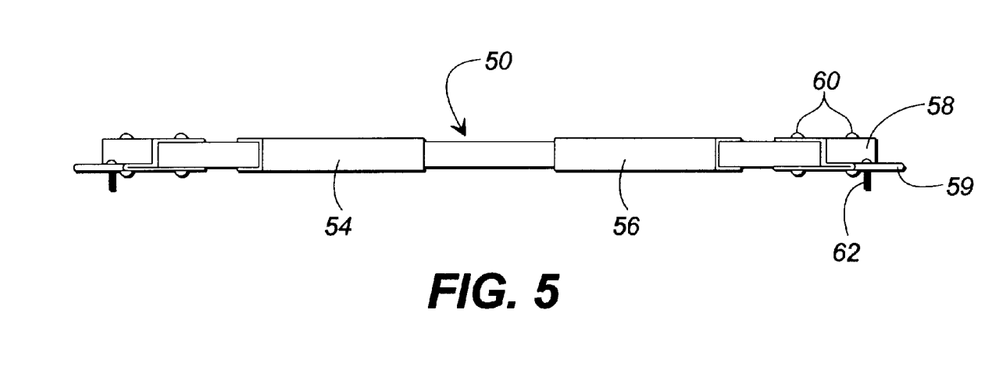
FIG. 5 is an elevational view of the back bar of FIG. 4.

Each end of the curved beam 52 is provided with a steel end fitting 58. Each end fitting 58 is preferably fabricated from sheet steel that is formed by bending to the desired shape. More particularly (see FIG. 5), the material of the end fitting 58 has a 180° bend at its distal end which defines a mounting ear 59. In addition, the material is subjected to two 90° bends that cooperate to define a pocket with a width corresponding to the thickness of the curved beam 52. Silicone adhesive and suitable mechanical fasteners 60 are used to attach the end fittings 58 to the curved beam 52. The fasteners 60 may, for example, be simple tubular rivets. To attach the end fitting to the U-shaped member 26 of the frame assembly 22, a suitable mechanical fastener 62 may be welded (r otherwise secured to the ear 59 of each fitting 58. Wing nuts or other conventional nuts may then be used to removably attach the back bar 50 to the parallel arms 28, 30.

Figure 6:
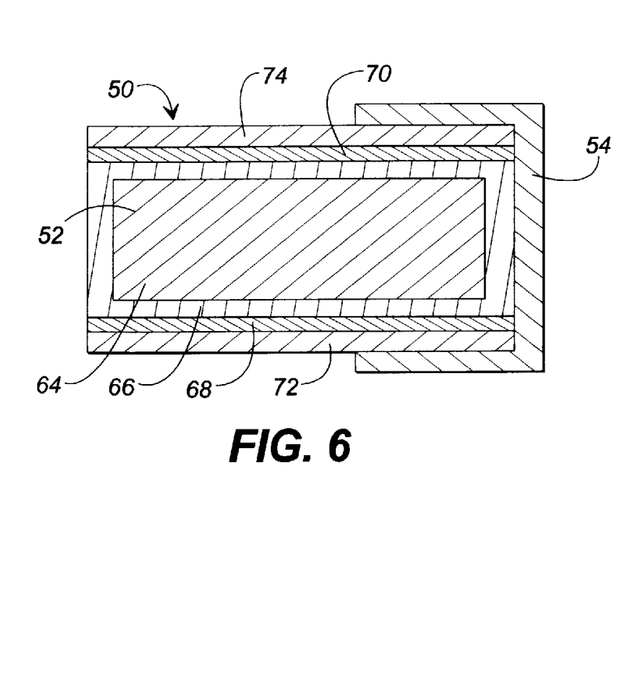
FIG. 6 is an enlarged cross-sectional view through the back bar taken along the line 6—6 of FIG. 5.

While details of fabricating the carbon-fiber-reinforced composite curved beam 52 will be discussed more fully below, general characteristics of the composite material can be seen in FIG. 6. The beam 62 includes a lightweight core 64 which may, for example, be a polymer foam such polyurethane with a density of 4 lb/ft$^3$. The foam core 64 is peripherally surrounded by carbon-fiber-reinforced sheath 66 having bi-directionally oriented carbon fibers in an epoxy matrix. Laminated to the top of the curved beam 52 are two layers 70, 74 having longitudinally extending carbon reinforcing fibers in an epoxy resin matrix. Likewise, laminated to the bottom of the curved beam 52 are two layers 68, 72 having longitudinally extending carbon reinforcing fibers in an epoxy resin matrix. The C-shaped, steel bearing face 54 can be seen encompassing one side edge of the curved beam 52.

Figure 7:
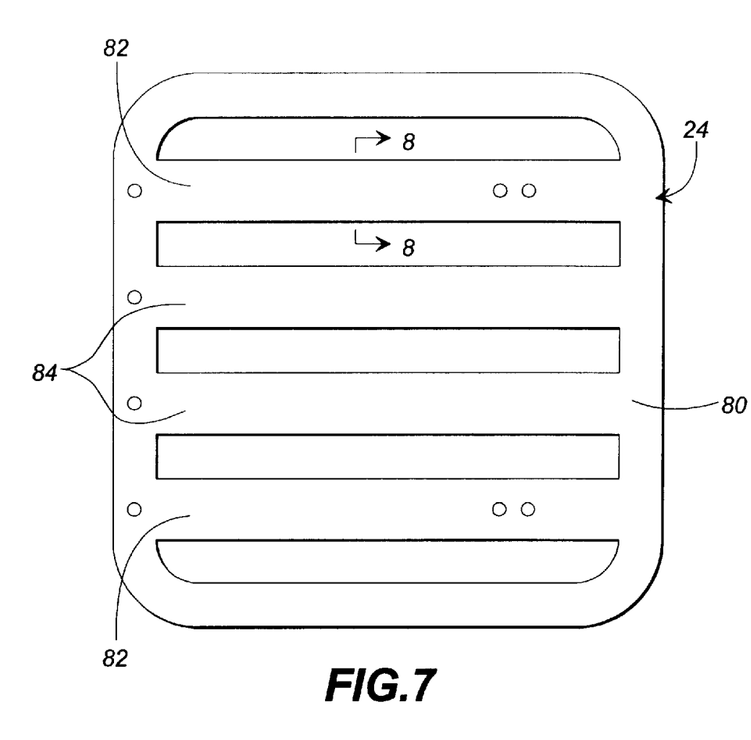
FIG. 7 is a plan view of the foot support platform of the portable device of FIG. 1.

Turning now to the platform assembly 24 (see FIG. 1), it will be seen that one edge portion is attached to the U-shaped element 26 of the frame assembly 22. For example, four mechanical fasteners can be applied to effect the connection. As with other connection, a silicone adhesive is first applied to the mating surfaces for the reasons already given. Moreover, it will be observed that the platform assembly 24 has a width that is less than the distance between the parallel arms 28, 30. But, it will further be seen that the width of the platform assembly 24 exceeds the lateral spacing between the ends of the brace member 36. The platform assembly 24 is also attached to the free ends of the brace member 36 by suitable conventional mechanical fasteners, such as stove bolts with round heads. Now, the platform assembly 24 (see FIG. 7) includes a perimeter beam 80 that extends around the periphery of the assembly 24. In addition, the assembly 24 has a pair of bracing slats 82 and a pair of spacer slats 84. The bracing slats 82 are vertically aligned with ends of the brace element 36 (see FIG. 1) while the spacer slats 84 (see FIG. 7) are positioned between the bracing slats 82. The bracing slats 82 and the spacer slats 84 are supported at their respective ends by the perimeter beam 80. If desired, additional spacer slats 84 could be used. Moreover, while the construction of the spacer slats 84 and the bracing slats 82 may be identical if desired, it is preferred that the slats be constructed for the mechanical duty to which they will be subjected to further minimize the weight of the overall device.

Figure 8:
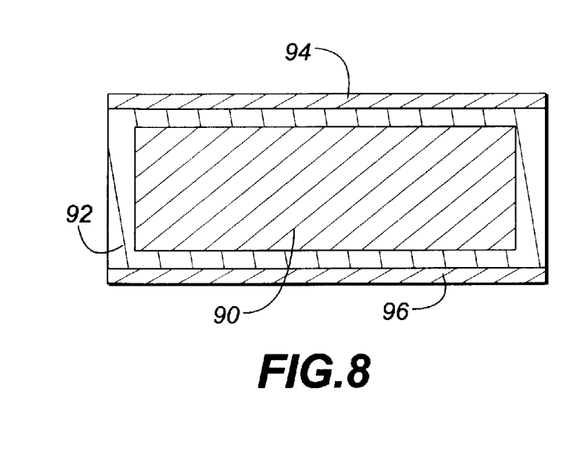
FIG. 8 is an enlarged, cross-sectional view taken along the line 8—8 of FIG. 7.

The cross section of one slat (see FIG. 8) is typical of the other slats as well as of the perimeter beam. Generally speaking, the cross section includes a lightweight core 90 such as a polyurethane foam which is surrounded by a sheath 92 fabricated from bi-directional carbon-fiber-reinforcements in an epoxy resin matrix. The sheath 92 surrounds all sides of the foam core 90. Each of the upper and lower surfaces of the cross section are also covered by a corresponding layer 94, 96 of carbon-fiber reinforced epoxy resin matrix having longitudinally extending reinforcing fibers. With this arrangement, it will be appreciated that the sheath 92 provides torsional stiffness while the upper and lower layers 94, 96 provide bending stiffness. The foam core provides resistance to buckling of the surface elements toward the center of the cross section.

When the back bar 50 and the platform assembly 24 are fabricated with the carbon-fiber-reinforced epoxy resin matrix, the climbing device is extremely light in comparison to known climbing devices. Moreover, the resulting device is extremely strong. For example, a climbing device according to this invention can be fabricated that weighs about 9.5 lb. as compared with known devices that weigh 50% more. At the same time, the climbing device according to this invention has been found to support 700 pounds whereas earlier devices with conventional fabrication techniques generally fail when subjected to force loading at that level.

At this junction it will be apparent to those skilled in the art that the back bar 50 and the platform assembly 24 derive significant advantages through assembly as composite structures using a foam core in conjunction with a carbon-fiber-reinforced sheath having bi-directionally aligned reinforcing fibers and carbon-fiber-reinforced surface layers having longitudinally aligned reinforcing fibers. Generally speaking, there are a variety of different reinforcing fibers that may be considered, including for example, but without limitation, carbon fibers, glass fibers, nylon fibers, polyimide fibers, Kevlar fibers, and metal fibers just to name a few. Likewise there are a variety of synthetic polymeric foam materials that can successfully and advantageously be used to make a lightweight core. A lightweight core can be made from a foam core material, including by way of example but without limitation, polymeric foam such as polyurethane foam, polyethylene foam, polyvinyl chloride foam, and polystyrene foam. Another lightweight core could be made from an an air- or gas-filled bag or bladder, with or without an internal body of foam, or honeycomb material. Further, various and sundry resin systems can be used, depending on the fiber reinforcement being used and the foam material being used. For example, and again without limitation, epoxy resin systems, polyester resin systems, and vinyl ester resin systems may be used in appropriate combinations of fibers and polymeric foams.

Nevertheless, at the present time it has been found that certain materials have produced the highly advantageous results described above. Generally speaking, carbon fibers are preferred for use as the reinforcements. For purposes of the bidirectionally reinforced sheath described above, preferred commercially available carbon fibers in the form of 60° braided sleeve having 12,000 fibers per strand are available from Atkins & Pierce, Lexington, Ky. For longitudinally reinforced surface layers, commercially available carbon fibers such as unitape with 24,000 fibers per strand from Techni-Weave, are suitable. A two-part epoxy resin matrix is also preferred. Epoxy resin offered commercially by Fiber Resin Corporation of Burbank, Calif., as BYU-0546-A/B, has been successfully used in combination with carbon fiber reinforcements. Insofar as the foam core material is concerned, polyurethane is the preferred material. Depending upon the need for compression resistance, either foam with a density of 1-2 lb/ft$^3$ or 4–6 lb/ft$^3$ are suitable, the higher density foam being preferred for areas where compression resistance is important.

Now, having described the detailed structural arrangement of a tree stand according to the invention, it is appropriate to consider the advantageous process which has been discovered for molding the carbon-fiber-reinforced elements—namely the platform assembly 24 and the curved beam used in the back bar 52.

As a preliminary step in fabricating the platform assembly, foam core pieces for the slats are cut to conform to the length of the slat. Then each foam core piece is inserted into a piece of braided carbon fiber sleeve so that the carbon fibers completely surround the foam core and extend about one inch beyond each end of the foam core. The extending portion of the carbon fiber sleeve is then slit on each side to the end of the foam core.

In a similar way, two U-shaped foam core pieces for the perimeter beam channel are cut and covered with appropriately lengths of braided sleeve. Again, the carbon fibers extend beyond the end of the foam core and are slit in the manner described above. The final preparatory step is to provide foam core pieces to fill in the space between the U-shaped foam core pieces in the perimeter beam channel and to cover these filler pieces with braided sleeve of carbon fibers. The carbon fiber sleeve for these filler pieces, however, is trimmed to conform to the length of the filler pieces.

Figure 9:
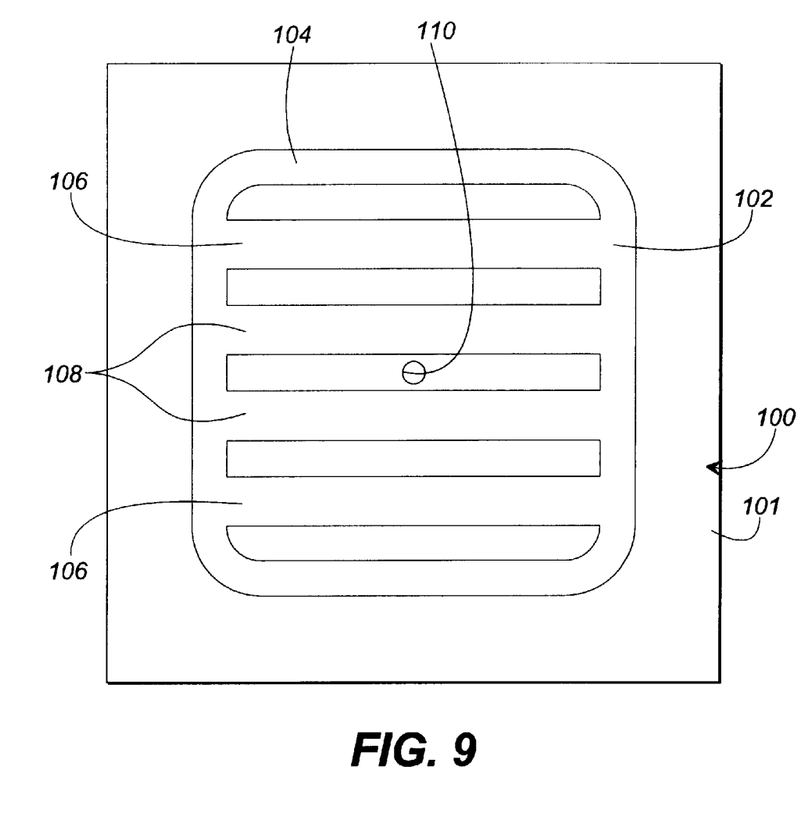
FIG. 9 is a plan view of a mold used for fabricating the platform of the portable device.

A one-piece female mold 100 (see FIG. 9) is provided having a mold cavity 102 in the upper planar surface 101. Aluminum has been found to be a suitable material for the mold as it is relatively inexpensive and readily machinable. The mold cavity 102 is machined into the top surface 101 of the mold 100 and have the shape of the desired finished element—in this case the platform assembly—and has at least one generally linear cavity portion. Here, the mold cavity 102 includes several generally linear cavity portions in the perimeter beam channel 104, as well as in a pair of support slat channels 106 and a pair of normal slat channels 108. At a suitable location, the mold 100 includes a port 110 extending through the mold for connection with a vacuum source.

As the process begins (see FIG. 10), strips 120, 122, 122' of carbon fiber tape are impregnated with epoxy resin and deposited in the perimeter beam channel 104 of the mold cavity. This epoxy impregnation step can be effected by brushing epoxy on the tape, or spraying the epoxy thereon, or in any other conventional manner. Each strip 120, 122, 122' may be trimmed at the end to accommodate curvature at the platform corners. Moreover, ends of the strips 120, 122, 122' are arranged so as to overlap at the curved platform corners. Although it is not necessary, if desired, supplemental pieces of strips may be laid in the corners at approximately a 45 degree angle to the strips 120, 122 in order to further reinforce the corners.

Figure 10:
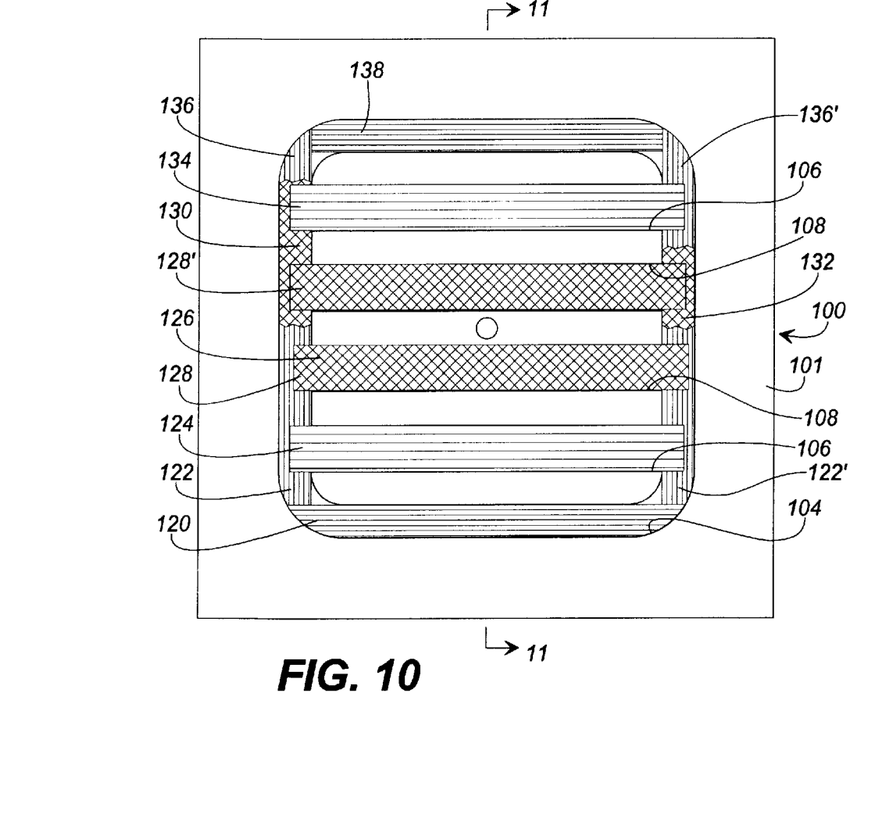
FIG. 10 is a view of the mold of FIG. 9 showing selected aspects of the assembly process at various times in the mold lay-up procedure.

Next, a strip 124 of carbon fiber tape impregnated with epoxy resin is placed in the bottom of each support slat channel 106 and each channel 108. These strips 124 extend beyond the length of the slat channels 106, 108 and overlie the epoxy impregnated strips in the perimeter beam channel 104. As seen in FIG. 10, the strips 124 may extend more than half way across the perimeter beam channel 104.

With the bottom of the mold cavity thus covered, the foam core pieces with their respective carbon fiber sleeves are positioned. More specifically, a foam core 126 for a slat channel 108 and its carbon fiber sleeve 128 is impregnated with epoxy resin in any convenient way and positioned in the slat channel 108 such that the foam core is essentially coextensive with the length of the channel 108 and such that an extending portion of the carbon fibers lies on the carbon fiber strips 122, 122'.

Having the channel core pieces in position, the U-shaped foam cores 130, 132 for the perimeter beam channel along with the respective carbon fiber sleeves are impregnated with epoxy resin in any convenient way and positioned. The U-shaped cores 130, 132 are located between the extending carbon fiber tabs 128 at the end of each slat core so that the U-shaped core 130, 132 are under the carbon fiber tabs 128 as seen in FIG. 10 at 128'. The filler pieces for the perimeter beam channel 104 are then impregnated with epoxy resin and installed between ends of the U-shaped cores 130, 132 so that the filler pieces a located between the upper and lower tabs of carbon fibers extending from the end of each U-shaped core. The entire mold cavity is thus filled with foam core pieces in bi-directionally reinforced carbon fiber sleeves impregnated with epoxy resin.

Thereafter, a strip 134 of carbon fiber tape impregnated with epoxy resin is placed on the top of the foam and fiber sleeve insert of each support slat channel 106 and each channel 108. These strips 134 extend beyond the length of the slat channels 106, 108 and overlie the U-shaped inserts 130, 132 in the perimeter beam channel 104. As seen in FIG. 10, the strips 124 may extend more than half way across the perimeter beam channel 104.

Next, strips 136, 136', 138 of carbon fiber tape are impregnated with epoxy resin in any convenient way and deposited over the foam inserts in the perimeter beam channel 104 of the mold cavity. Each strip 136, 136', 138 may be trimmed at the end to accommodate curvature at the platform corners. Moreover, the strips 136, 136' 138 are arranged so as to overlap at the curved platform corners. As with the bottom layer of strips, it is not necessary, but if desired, supplemental pieces of strips may be laid in the corners at approximately a 45° angle to the strips 136, 138 in order to further reinforce the corners.

The foregoing steps effectively complete the structural lay-up of the platform assembly so that the molding process can be started. While the molding operation could be conducted with cooperating male, female mold parts, it has been found that low-pressure vacuum bag molding is satisfactory, inexpensive, and easier to use. Accordingly, vacuum bag molding is the preferred technique. To effect vacuum-bag molding in the mold 100 (see FIG. 11), a perforated mold release film 150 is placed on top of the filled mold 100 so as to completely cover the resin-impregnated layers. When pressure is applied, the perforations of the mold release film 150 allow excess resin to leave the mold cavity 102. The mold release film 150 is covered by a bleeder cloth 152 which is substantially coextensive with the mold release film 150. The bleeder cloth 152 soaks up resin that leaves the mold cavity through pores of the release film 150. Finally, the bleeder cloth 152 is covered by the bagging film 154.

Figure 11:
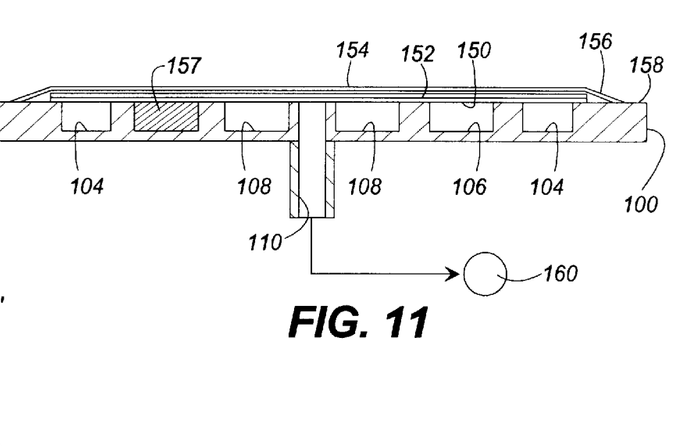
FIG. 11 is an enlarged cross-sectional view of the mold taken along line 11—11 of FIG. 10 and further illustrating molding steps.

This bagging film 154 extends beyond the bleeder cloth 152 and beyond the mold release film 150 so that the bagging film 154 can be sealed to the skirt 158 surrounding the mold cavity. The bagging film 154 can be conveniently sealed using any suitable conventional tape.

With the mold filled and sealed, the port 100 extending through the mold is placed in fluid communication with a conventional vacuum pump 160 capable of reducing pressure in the mold to a vacuum on the or der of 26" Hg. With the vacuum in the mold cavity, atmospheric pressure compresses the constituent layers, reinforcing fibers, and resin firmly into the mold cavity resulting in a smooth surface finish on those molded surfaces contacting the mold 100. While the vacuum is exerted on the mold, the mold is subjected to infrared heating lamps that raise the temperature of the mold and its contents to about 150° F. to cure the resin. Typically a cure time of about 4 hours can be expected.

When the curing is complete, the bagging film 154, bleeder cloth 152, and mold release film 150 a re removed from the top of the mold 100. Then , the unitary, one-piece platform assembly is taken out of the mold cavity. The top of the structure in the mold cavity 102 is the bottom of the finished product. Accordingly, smooth, high quality surfaces are attained on the top and sides of the finished, molded platform assembly 24.

As noted above, the lightweight core may even be an air- or gas-filled bladder. When such an air or gas bladder is used as the lightweight core 157 (see FIG. 11), pressure in the bladder is effective to press against sidewalls of the mold cavity enhancing surface finish of the molded article.

In the foregoing description of the process, no distinction was drawn to the type of foam used in the core. Nevertheless, different foam densities can be used in different parts of the mold to accommodate the mechanical duty anticipated. For example, in the bracing slat channels 106, high density polyurethane foam may be used since these slats will be bolted to the bracing member 34. For similar reasons, the U-shaped perimeter beam foam insert positioned adjacent to the bearing element may be fabricated with high density polyurethane foam.

Fabrication of the curved beam 52 (see FIG. 4) of the back bar assembly 50 is accomplished in an analogous manner to the process described for the platform assembly. Accordingly, it will suffice to describe the differences here.

Figure 12:
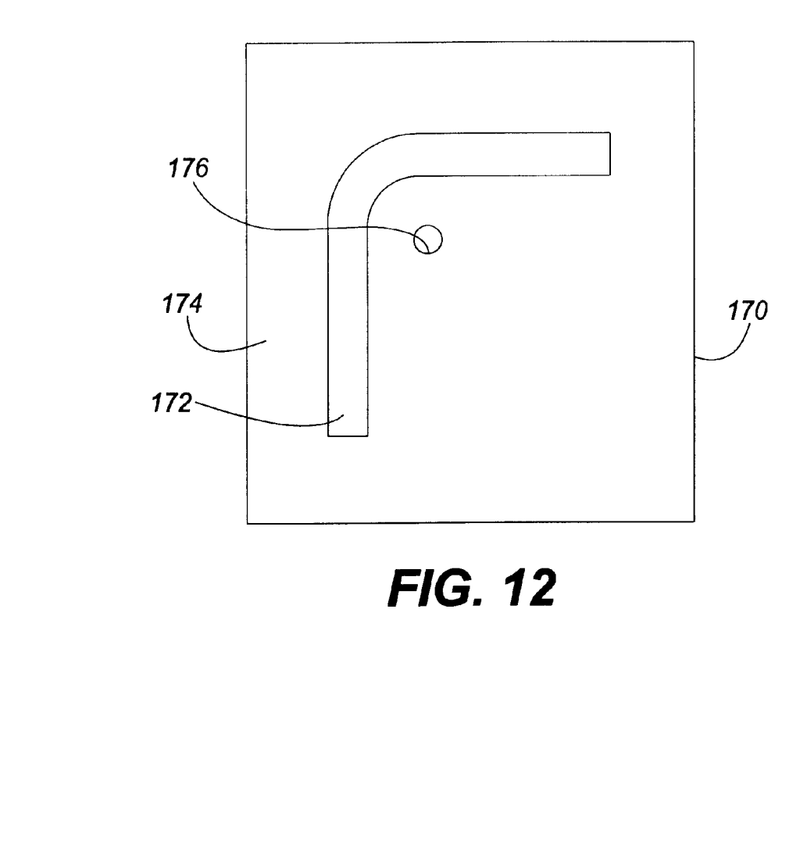
FIG. 12 is a plan view of a mold used for fabricating a curved beam for the back bar.

Naturally, the first difference is that a one-piece curved-beam mold 170 (see FIG. 12) must be provided having a mold cavity 172 that conforms to the desired shape of the curved beam 52. The top surface 174 of the mold 170 conmmunications with a vacuum port 176. Bearing in mind that the curved beam is a less complex structure than is the platform assembly discussed above, it is possible arrange the mold 170 with multiple curved beam cavities so as to fabricate several at the same time.

Preliminary to the molding, a polyurethane foam insert is cut to the length of the curved beam and provided with a sleeve of bi-directional carbon fibers discussed above. Here, however, the sleeve is trimmed so that its length corresponds to the length of the foam core.

Figure 13:
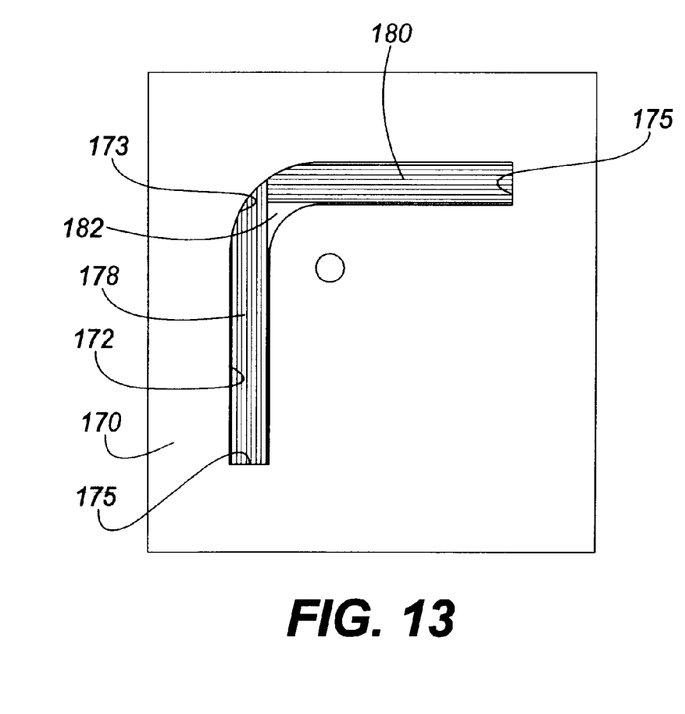
FIG. 13 is a view of the mold of FIG. 12 showing selected aspects of the mold lay-up procedure.

The first step in lay up of the curved beam is to place strips 178, 180 (see FIG. 13) of carbon fiber tape impregnated with epoxy resin in the bottom of the generally linear portions of the mold cavity 172. At the sharply curved portion 173, the ends of the strips 178, 180 overlap. If desired, the strips can be caused to curve slightly in the direction of curvature so as to reduce the unreinforced area 182. At the ends 175, 175' of the mold cavity 172, the resin impregnated strips can be turned upwardly so as to cover ends of the final beam structure. As noted above, the curved beam has two layers of longitudinally reinforced composite material at the upper and lower surfaces. Accordingly, the foregoing step is repeated so that there are two layers in the bottom of the mold cavity 172, although in the second layer, the strips may be trimmed so as to lie entirely at the bottom of the mold cavity 172 without end portions turned upwardly against the ends 175, 175' of the mold.

The foam core is then impregnated with resin and deposited in the mold, as described above relative to the platform assembly. Then, two additional layers of resin impregnated strips are placed on top of the foam insert. After covering the lay-up with a mold release sheet, a bleeder cloth, a vacuum bagging sheet, and sealing the sheet to the mold surface, vacuum and heat are applied as described more fully above.

Since the curved beam 52 (see FIG. 4) is intended to be subjected to surface pressure, the foam insert is preferably fashioned from 4 lb/ft$^3$ polyurethane foam. Moreover, the higher density foam provides an improved backing to pressure applied during the process of applying the rivets 60 (see FIG. 5).

The platform assembly 24 (see FIG. 1) of this invention may be used with a portable tree stand intended to be positioned at an elevated location on a tree and left there for occasional use. Alternatively, the platform assembly 24 may be used with a climbing tree stand (see FIG. 14). In this case, the platform assembly 24 is part of a foot support unit 190 which is used in conjunction with a seat unit 192. The foot support unit 190 is preferably constructed and arranged as described above in detail and uses both the fiber composite platform assembly 24 and the fiber composite back beam assembly 50. The seat unit 192 may also use the fiber composite back beam assembly 50 described above. Otherwise, the seat unit 192 may have the same arrangement as is described in U.S. Pat. No. 5,226,505, issued to Woller et al., which is incorporated herein in its entirety by this reference thereto.

Figures 14, 15:
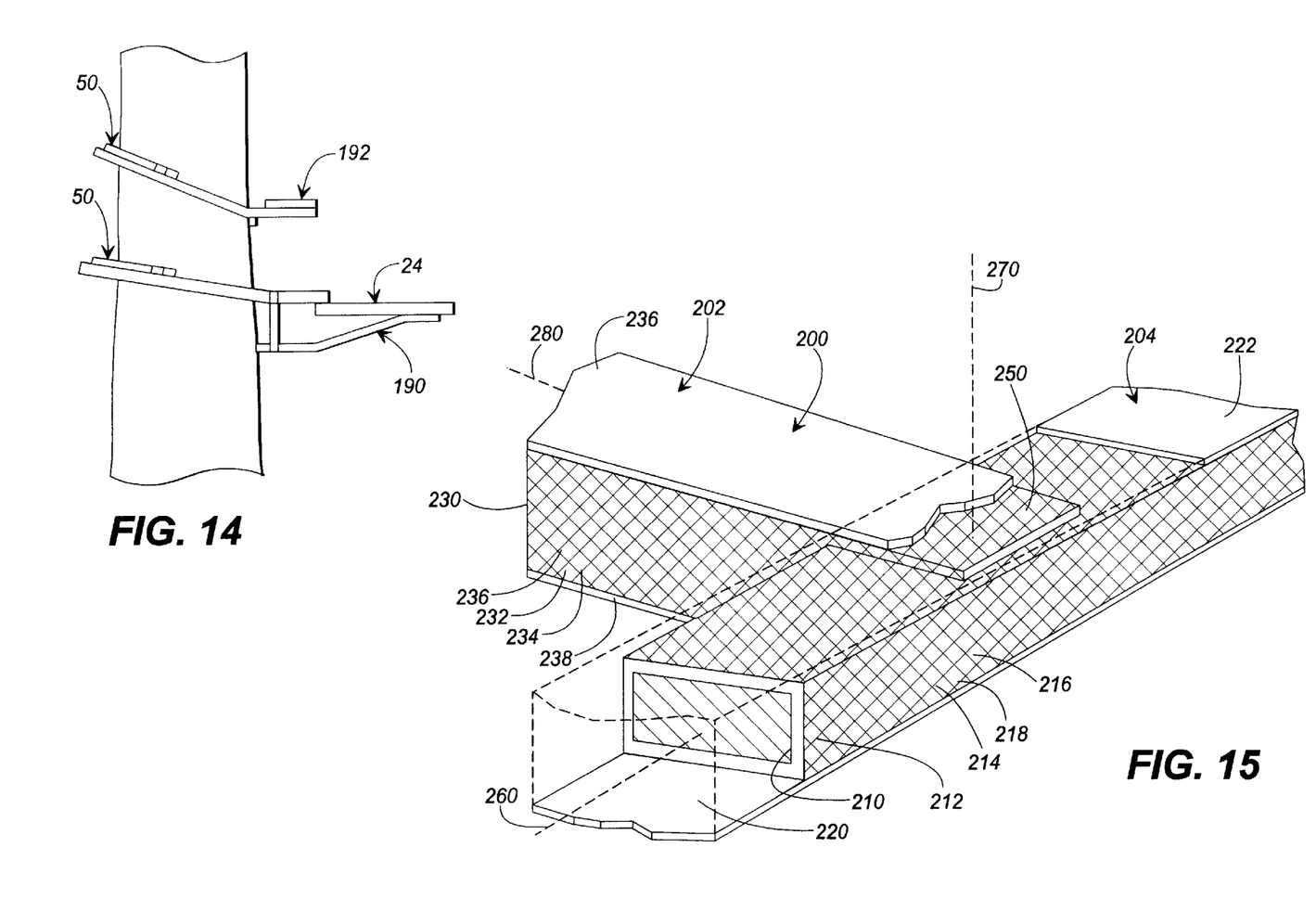
FIG. 14 is a side elevational view of a climbing tree stand apparatus.
FIG. 15 is an isometric view of the carbon fiber reinforced T-joint used in the platform with portions broken away in the interest of clarity.

When the platform assembly 24 is used as a climbing tree stand, operation of the seat unit 192 and the foot support unit 190 follows the discussion in U.S. Pat. No. 5,226,505, which has been incorporated herein.

Details of the platform assembly lay-up also disclose a new carbon-fiberreinforced joint having useful application not only in the particular platform assembly here but also in a wide variety of other assemblies. More specifically, the T-joint 200 (see FIG. 15) effects a substantially perpendicular connection between two members 202, 204. While FIG. 15 illustrates a substantially perpendicular connection arrangement, the joint structure would work equally well with members that meet with practically any angle.

In the context of the platform assembly described above, the terminating member 202 corresponds to a slat, while the continued member 204 corresponds to the perimeter beam. The continued member 204 has a polyurethane foam core 210 as previously described. In cross section, the foam core 210 may be rectangular, square, polygonal, elliptical, circular, or curved, as may be desired. However, the foam core 210 is encased in a bi-directionally reinforced sheath 212 of carbon fibers 214, 216 in an epoxy matrix 218. In FIG. 15 the filaments 214, 216 are merely intended to be representative of the fiber orientations in the sheath 212; however, the filaments 214, 216 also show the two directions in which the sheath 212 is bi-directionally reinforced. In particular it will be noted that the fiber orientations tend to helically wrap the foam core in oppositely spiralling directions along the longitudinal direction of the core. Furthermore, two opposed sides of the continued member 204 include a carbon-fiber-reinforced layers 220, 222. These side layers have are longitudinally reinforced with carbon fibers in an epoxy matrix, i.e., the reinforcing fibers are substantially aligned with the longitudinal direction of the member 204, and its core 210.

The terminated member 202 also has a foam core, but it cannot be seen in FIG. 15. The foam core of the terminated member 202 is also encased in a bi-directionally reinforced sheath 230 of carbon fibers 232, 234, in an epoxy matrix 236. The filaments 232, 234 are illustrative of the fiber orientations in the sheath 230, as described above. Here again, it will be noted that the fiber orientations tend to helically wrap the foam core in oppositely spiralling directions along the longitudinal direction of the core. Furthermore, two opposed sides of the terminated member 202 include a carbon-fiber-reinforced layers 236, 238. These side layers have are longitudinally reinforced with carbon fibers in an epoxy matrix, i.e., the reinforcing fibers are substantially aligned with the longitudinal direction of the member 202, and its core.

In the T-joint, the bi-directionally reinforced sheath 230 of the terminated member 202 is cut to define two ears 250, one of which is shown, the other being on the bottom and not visible in FIG. 15. The sheath 212 of the continued member 204 is received between the ears 250 so that the sheath 212 abuts the end of the terminated member 202. The side layers 236, 238 of the terminated member 202 overlie corresponding ears 250 on corresponding sides of the continued member 204, specifically on the bi-directionally reinforced sheath 212. The side layers 220, 222 of the continued member 204 overlie the ears 250 and the extended portions of the side layers 236, 238 of the terminated member.

Despite the anisotropic characteristics of fiber reinforced matrices, the resulting T-joint exhibits excellent strength when (i) the terminated member 202 is turned about the longitudinal axis 260 of the continued member 204, (ii) the terminated member 202 is turned about the transverse axis 270 of the continued member 204, and (iii) the terminated member is turned about its own longitudinal axis 280. While the actual mechanism for increased strength in this T-joint is not fully understood, it may result from the bi-directional torsional strength imparted by the carbon fibers in the sheath 230 and the fact that certain of those torsionally acting fibers terminate on the sides of the continued member 204 so that tension resisting characteristics of the carbon fibers act to stabilize the members 202, 204 when twisting forces are applied thereto.

It should now be apparent to those skilled in the art that a new and improved portable tree stand has been described, as well as a new and improved fiber reinforced platform, a new and improved fiber-reinforced T-joint, and a new and improved fiber-reinforced back bar assembly. It will also be apparent to those skilled in the art that numerous modifications, variations, substitutions, and equivalents exist for elements of the invention which do not materially depart from the spirit and scope of the invention. Accordingly, it is expressly intended that all such modifications, variations, substitutions, and equivalents which fall within the spirit and scope of the invention as defined by the appended claims be embraced thereby.

What is claimed is:

1. A lightweight portable tree stand for establishing an elevated observation site, comprising:

a frame assembly including a pair of generally parallel arms spaced from one another to straddle the diameter of a tree, a pair of laterally spaced convex elements for bearing against a tree, a brace member, each arm including a plurality of spaced holes;

a back bar assembly having a pair of ends, a length sufficient to extend between the parallel arms, and means for attaching each end to a corresponding one of the parallel arms so as to encircle a tree; and a molded platform, attached to the frame assembly and to the brace member, having a lightweight core, a sheath around the lightweight core of spirally directed reinforcing fibers in an epoxy matrix, and surface layers of epoxy matrix with longitudinally oriented reinforcing fibers.

2. The lightweight tree stand of claim 1 wherein the back bar assembly includes a curved beam having a lightweight core, a sheath around the lightweight core of spirally directed reinforcing fibers in an epoxy matrix, and surface layers of epoxy matrix with longitudinally oriented reinforcing fibers.

3. The lightweight tree stand of claim 1 wherein the lightweight core is fabricated from a polymer foam.

4. The lightweight tree stand of claim 3 wherein the polymer foam is selected from the group consisting of polyurethane foam, polyethylene foam, polyvinyl chloride foam, and polystyrene foam.

5. The lightweight tree stand of claim 4 wherein the polymer foam is polyurethane foam.

6. The lightweight tree stand of claim 1 wherein the reinforcing fibers are selected from the group consisting of carbon fibers, glass fibers, nylon fibers, polyimide fibers Kevlar fibers, and metal fibers.

7. The lightweight tree stand of claim 1 wherein the sheath having spirally oriented reinforcing fibers includes bi-directionally oriented reinforcing fibers.

8. The lightweight tree stand of claim 7 wherein the bi-directionally oriented reinforcing fibers are carbon fibers.

9. A climbing tree stand for established an elevated observation site, comprising:

a foot support unit having
      a frame assembly including a pair of generally parallel arms spaced from one another to straddle the diameter of a tree, a pair of laterally spaced convex elements for bearing against a tree, a brace member, each arm including a plurality of spaced holes;
      a back bar assembly having a pair of ends, a length sufficient to extend between the parallel arms, and means for attaching each end to a corresponding one of the parallel arms so as to encircle a tree; and
      a molded platform, attached to the frame assembly and to the brace member, having a lightweight core, a sheath around the lightweight core of spirally directed reinforcing fibers in an epoxy matrix, and surface layers of epoxy matrix with longitudinally oriented reinforcing fibers; and a seat unit including
      a seat frame assembly including a pair of generally parallel arms spaced from one another to straddle the diameter of a tree, and a pair of laterally spaced convex elements for bearing against a tree, each arm including a plurality of spaced holes;
      a back bar assembly having a pair of ends, a length sufficient to extend between the parallel arms of the seat frame, and means for attaching each end to a corresponding one of the parallel arms so as to encircle a tree; and
      a seat supported by the seat frame assembly.

* * * * *